United States Patent
Baba et al.

(10) Patent No.: US 9,639,763 B2
(45) Date of Patent: May 2, 2017

(54) IMAGE TARGET DETECTING APPARATUS AND METHOD

(71) Applicant: FUJITSU LIMITED, Kawasaki-shi, Kanagawa (JP)

(72) Inventors: Kozo Baba, Oita (JP); Norio Hashiguchi, Yokohama (JP); Kunikazu Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/633,339

(22) Filed: Feb. 27, 2015

(65) Prior Publication Data

US 2015/0169970 A1 Jun. 18, 2015

Related U.S. Application Data

(63) Continuation of application No. PCT/JP2012/072080, filed on Aug. 30, 2012.

(51) Int. Cl.
*G06K 9/00* (2006.01)
*G06T 7/00* (2017.01)
(Continued)

(52) U.S. Cl.
CPC .......... *G06K 9/00805* (2013.01); *G06T 7/004* (2013.01); *G06T 7/20* (2013.01);
(Continued)

(58) Field of Classification Search
CPC .......... G06K 9/00791; G06K 9/00798; G06K 9/00825; G06K 9/00805;
(Continued)

(56) References Cited

U.S. PATENT DOCUMENTS

2009/0010495 A1* 1/2009 Schamp .............. B60R 21/0134
382/106
2009/0154808 A1* 6/2009 Gao ................... G06K 9/00791
382/173
(Continued)

FOREIGN PATENT DOCUMENTS

CN 101564300 A 10/2009
JP H05-143897 A 6/1993
(Continued)

OTHER PUBLICATIONS

Wang et al., "Robust and Real-Time Traffic Lights Recognition in Complex Urban Environments", Dec. 2011, Int. Journal of Computational Intellligence Systems, vol. 4, No. 6, p. 1383-1390.*
(Continued)

*Primary Examiner* — Siamak Harandi
*Assistant Examiner* — Timothy Choi
(74) *Attorney, Agent, or Firm* — Fujitsu Patent Center

(57) ABSTRACT

An image processing apparatus 10 according to an embodiment includes a detection unit 11 and an identification unit 12. The detection unit 11 included in the image processing apparatus 10 detects a region in which a pixel value is changed between frames included in moving image data. The detection unit 11 outputs a detected result to the identification unit 12. The identification unit 12 sets a circumscribed rectangle to the region detected by the detection unit 11. The identification unit 12 specifies a frame including a detection target based on a filling ratio of the region to the circumscribed rectangle.

7 Claims, 8 Drawing Sheets

(51) Int. Cl.
*G06T 7/20* (2017.01)
*G08G 1/16* (2006.01)

(52) U.S. Cl.
CPC .. *G06T 7/2053* (2013.01); *G06T 2207/10016* (2013.01); *G06T 2207/10024* (2013.01); *G06T 2207/20224* (2013.01); *G06T 2207/30256* (2013.01); *G06T 2207/30261* (2013.01); *G08G 1/16* (2013.01)

(58) Field of Classification Search
CPC . G06T 2207/30248; G06T 2207/30252; G06T 2207/30261; G06T 7/004; G06T 7/20; G06T 7/20153; G06T 2207/20224; G08G 1/16; G08G 1/161; G08G 1/162; G08G 1/163; G08G 1/166; G08G 1/167
See application file for complete search history.

(56) References Cited

U.S. PATENT DOCUMENTS

2010/0002911 A1* 1/2010 Wu ................ G06K 9/00798
 382/104

2011/0128379 A1* 6/2011 Lee ................ G06K 9/00805
 348/144

FOREIGN PATENT DOCUMENTS

| | | |
|---|---|---|
| JP | 2002-218452 A | 8/2002 |
| JP | 2005-346387 A | 12/2005 |
| JP | 2007-188294 A | 7/2007 |
| JP | 2007-323281 A | 12/2007 |
| JP | 2008-204102 A | 9/2008 |
| JP | 2011-028415 A | 2/2011 |
| JP | 2011-070566 A | 4/2011 |

OTHER PUBLICATIONS

Wang et al., "Machine translation of CN 101564300", Oct. 28, 2009, ESpacenet, p. 1-22.*

International Search Report, mailed in connection with PCT/JP2012/072080 and mailed Nov. 20, 2012 (9 pages).

Chinese Office Action mailed Jan. 25, 2016 for corresponding Chinese Patent Application No. 201280075326.X, with English Translation, 13 pages.

* cited by examiner

FIG.3

| FRAME NUMBER | DATE AND TIME | SPEED | ACCELERATION | ... | LOCATION COORDINATES | IMAGE (141) |
|---|---|---|---|---|---|---|
| N-1 | DATE AND TIME XN-1 | SPEED AN-1 | ACCELERATION BN-1 | | $x_{n-1}, y_{n-1}$ | IMAGE DATA OF FRAME N-1 |
| N | DATE AND TIME XN | SPEED AN | ACCELERATION BN | | $x_n, y_n$ | IMAGE DATA OF FRAME N |
| N+1 | DATE AND TIME XN+1 | SPEED AN+1 | ACCELERATION BN+1 | | $x_{n+1}, y_{n+1}$ | IMAGE DATA OF FRAME N+1 |
| | | | | ... | | |

IMAGE TARGET DETECTING APPARATUS AND METHOD

CROSS-REFERENCE TO RELATED APPLICATION(S)

This application is a continuation of International Application. No. PCT/JP2012/0720.80, filed on Aug. 30, 2012, the entire contents of which are incorporated herein by reference.

FIELD

The embodiments discussed herein are related to an image processing apparatus and an image processing method.

BACKGROUND

In driving a vehicle, if it is possible to inform a driver of information on locations where a near miss, that is, phenomenon such that the driver gets a fright or gets startled such as nearly colliding with a pedestrian often occurs, it may be possible to prevent an accident from occurring. Data recorded in a drive recorder may be used for identifying the information on the locations where a near miss often occurs. For example, in the drive recorder, a position of the vehicle, a date and time of photographing, acceleration of the vehicle, speed of the vehicle, an image ahead of the vehicle, and the like are recorded.

Here, if detection of a near miss is attempted only using numeric data such as the acceleration recorded in the drive recorder, in some cases, a phenomenon that is not really a near miss may be erroneously detected as a near miss. It is because, in some cases, the acceleration is abruptly changed while the vehicle is driven unrelated to a near miss due to ups and downs of a road and the like.

In order to prevent the near miss as described above from being erroneously detected, it is desired that an analysis be made whether it has been a near miss or not based on the image ahead of the vehicle recorded together with the acceleration.

As a cause of a near miss, existence of a detection target such as a pedestrian and a bicycle within own lane may be listed. Therefore, by determining whether or not the detection target exists in the image as well as using information on the acceleration, it is possible to determine whether or not the cause of a near miss exists in the image, whereby it is possible to analyze whether or not it has been a near miss or not.

Patent Literature 1: Japanese Laid open Patent Publication. No. 05-143897

SUMMARY

According to an aspect of an embodiment, an image processing apparatus, includes a processor configured to execute a process including: detecting a region in which a pixel value is changed between frames included in moving image data and identifying a frame including a detection target based on a filling ratio of the region to a circumscribed rectangle of the region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating one example of a data structure of drive recorder information;

DESCRIPTION OF EMBODIMENTS

With the above-described prior art, however, there is a problem in that accurate detection of the detection target is not possible.

A camera for the drive recorder is mounted on the vehicle, and the camera is moved as the vehicle moves, whereby in an image recorded by the drive recorder, it seems as though a stationary object is moving. Therefore, when a region in which there is a change between frames is simply determined as the detection target, within a own lane region, paint and the like within the lane, which are the stationary objects, may also be determined as the detection target in some cases.

Preferred embodiments of the present invention will be explained with reference to accompanying drawings. Note, however, that the present invention is not to be limited by the embodiments.

[a] First Embodiment

Figure 1:
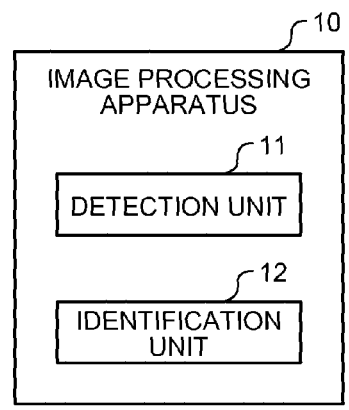
FIG. 1 is a function block diagram illustrating a configuration of an image processing apparatus according to a first embodiment.

A configuration of an image processing apparatus according to a first embodiment is described. FIG. 1 is a function block diagram illustrating the configuration of the image processing apparatus according to the first embodiment. As illustrated in FIG. 1, an image processing apparatus 10 includes a detection unit 11 and an identification unit 12.

The detection unit 11 detects a region in which a pixel value is changed between frames included, in moving image data.

The identification unit 12 specifies a frame including a detection target based on a filling ratio of the region detected by the detection unit 11 to a circumscribed rectangle of the region.

An effect of the image processing apparatus 10 according to the first embodiment is described. The image processing apparatus 10 detects the region in which the pixel value is changed between the frames included in the moving image data, and based on the filling ratio of the detected region to the circumscribed rectangle of the region, specifies the frame including the detection target. For example, in many cases, paint within a lame appears as the region having a nearly rectangular shape on an image whereas a pedestrian, a bicycle, and the like to be the detection target have an irregular shape. Therefore, it is possible to accurately detect the detection target by using the filling ratio relative to the circumscribed rectangle.

[b] Second Embodiment

Figure 2:
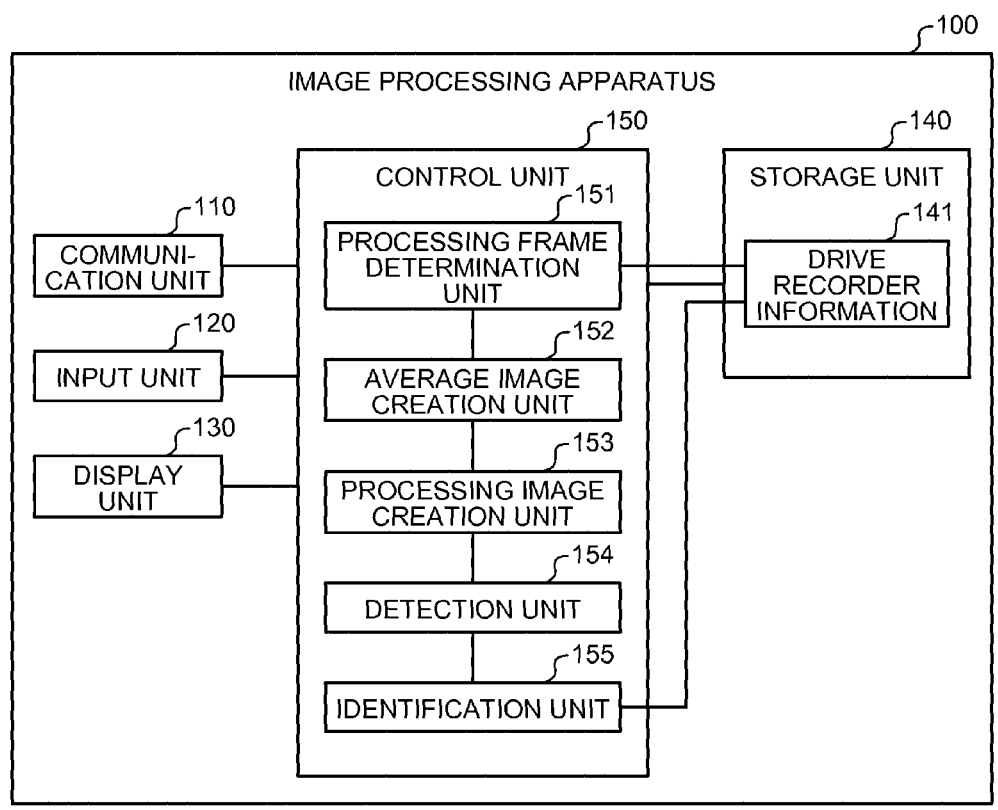
FIG. 2 is a function block diagram illustrating a configuration of an image processing apparatus according to a second embodiment.

A configuration of an image processing apparatus according to a second embodiment is described. FIG. 2 is a function block diagram illustrating the configuration of the image processing apparatus according to the second embodiment. As illustrated in FIG. 2, an image processing apparatus 100 includes a communication unit 110, an input unit 120, a display unit 130, a storage unit 140, and a control unit 150.

The communication unit 110 is a processing unit that executes data communication with another device through a network. For example, the communication unit 110 corresponds to a communication device and the like.

The input unit 120 is an input device for inputting various data to the image processing apparatus 100. For example, the input unit 120 corresponds to a keyboard, a mouse, a touch panel, and the like. The display unit 130 is a display device that displays data, which is output from the control unit 150. For example, the display unit 120 corresponds to a liquid crystal display, a touch panel, and the like.

The storage unit 140 is a storage unit that stores drive recorder information 141. For example, the storage unit. 140 corresponds to a storage device such as a semiconductor memory element such as a random access memory (RAM), a read only memory (ROM), and a flash memory.

The drive recorder information 141 includes various data recorded by a drive recorder. FIG. 3 is a view illustrating one example of a data structure of the drive recorder information. As illustrated in FIG. 3, the drive recorder information 141 stores a frame number, a date and time, a speed, acceleration, location coordinates, and an image. The frame number is the number that uniquely distinguishes a frame. The date and time is the date and time of photographing the corresponding frame. The speed is the speed of a vehicle on which the drive recorder is mounted at the point of photographing the corresponding frame. The acceleration is the acceleration of the vehicle on which the drive recorder is mounted at the point of photographing the corresponding frame. The location coordinates are the location coordinates of the vehicle on which the drive recorder is mounted at the point of photographing the corresponding frame. The image is image data of the corresponding frame.

The control unit 150 includes a processing frame determination unit 151, an average image creation unit 152, a processing image creation unit 153, a detection unit 154, and an identification unit 155. The control unit 150 corresponds to an integration device such as an application specific integrated circuit (ASIC) and a field programmable gate array (FPGA), for example. The control unit 150 also corresponds to an electronic circuit such as a CPU and a micro processing unit (MPU), for example.

The processing frame determination unit 151 is a processing unit that accesses the drive recorder information 141 and extracts each of the image data corresponding to the frame number while the vehicle is decelerating. In descriptions below, the image data corresponding to the frame number while the vehicle is decelerating is expressed as a processing frame. The processing frame determination unit 151 outputs information on each of the processing frames that has been extracted to the average image creation unit 152.

The average image creation unit. 152 is a processing unit that creates an average image of each of the processing frames acquired from the processing frame determination unit 151. For example, the average image creation unit 152 performs addition of each of pixel values in the processing frame for each pixel. Then, the average image creation unit 152 creates the average image by dividing a pixel value of each of the added pixels by the number of processing frames. The processing of creating the average image from each of the processing frames by the average image creation unit 152 is not limited to the above-described processing, and any well-known technique may be used. The average image creation unit 152 outputs the average image and the information on each of the processing frames to the processing image creation unit 153.

The processing image creation unit 153 generates a difference image between the processing frame and the average, image for each of the processing frames. The processing image creation unit 153 also generates a binary image based on each of the difference images. Hereinafter, processing of generating the difference image and processing of generating the binary image by the processing image creation unit 153 are described.

The processing of generating the difference image by the processing image creation unit 153 is described. For example, the processing image creation unit 153 generates the difference image by subtracting the pixel value of each of the pixels in the average image from the pixel value of each of the pixels in the processing frame. The processing image creation unit 153 generates the difference image for all of the processing frames.

The processing of generating the binary image by the processing image creation unit 153 is described. The processing image creation unit 153 decomposes the difference image into red, green, and blue (RGB). After the difference image has been decomposed into the RGB, for each of the pixels therein, in a case where R, G, and B values exceeds respective predetermined threshold values, the processing image creation unit 153 generates the binary image by setting the pixel value of the corresponding pixel to "1" and the pixel value of other pixels to "0". The processing image creation unit 153 generates the binary image for each of the difference images. The processing image creation unit 153 outputs information on the binary image to the detection unit 154.

For example, the processing image creation unit 153 may create a histogram of each of the RGB values and may set the value exceeding 80% as the threshold value to be compared with each of the R value, G value, and B value.

Due to an influence of light from the vehicle and light outside, the image of the processing frame may be reddish in some cases. To deal with this, it is possible to improve detection accuracy of a detection target by decomposing the image into the RGB and generating the binary image as described above.

Figure 4:
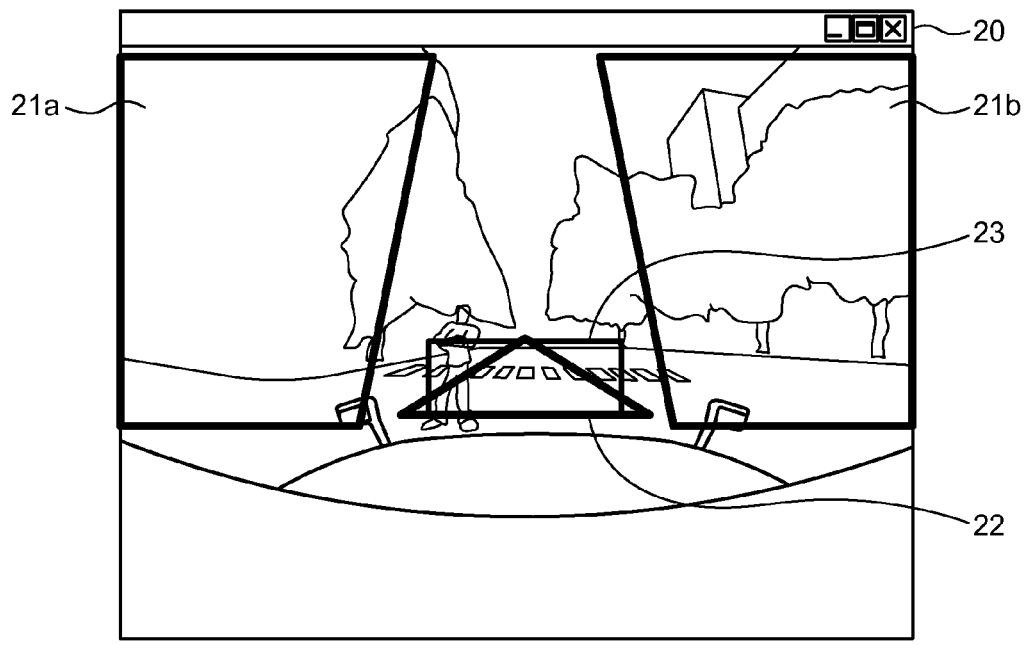
FIG. 4 is a view for describing one example of a range of processing.

Note that the processing image creation unit 153 may limit a range of processing in generating the binary image. FIG. 4 is a view for describing one example of the range of processing. For example, in image data 20, a difference becomes larger in regions 21a and 21b as the vehicle moves. Therefore, the regions 21a and 21b are excluded from the detection target. Instead, the detection accuracy of the detection target is improved by setting a predetermined, region including own lane 22 as a range of processing 23. For example, the processing image creation unit 153 generates the binary image of the range of processing 23 and skips generation of the binary image of any other regions, whereby it is possible to prevent erroneous detection of the detection target as well as to reduce a processing load. The processing image creation unit 153 may use any well-known technique for detecting own lane.

The detection unit 154 is a processing unit that detects, based on the binary image, the region in which the pixel valve is changed between frames included in moving image data. The detection unit 154 executes labeling processing and corner determination processing.

The labeling processing executed by the detection unit. 154 is described. The detection unit 154 executes the labeling processing of scanning the binary image and joining together the consecutive pixels each having the pixel value of "1". In descriptions below, the region in which the pixels are joined together in the labeling processing is described as a candidate region. After the candidate region has been detected, the detection unit 154 executes an area check, a filling ratio check, and an aspect ratio check thereon and excludes the candidate region not corresponding with the detection target.

The area check executed by the detection unit 154 is described. The detection unit 154 leaves the corresponding candidate region in a case where an area of the candidate region is equal to or greater than a predetermined area set in advance. In contrast, the detection unit 154 excludes the corresponding candidate region in a case where the area of the candidate region is less than the predetermined area set in advance.

Figure 5:
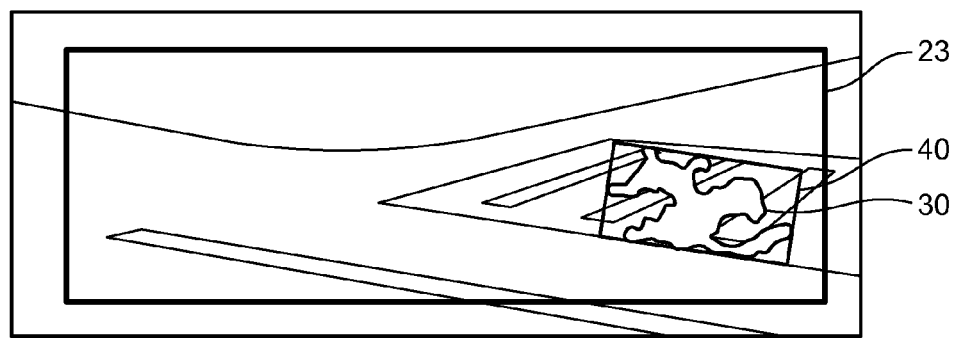
FIG. 5 is a view for describing a filling ratio check.

The filling ratio check executed by the detection unit 154 is described. FIG. 5 is a view for describing the filling ratio check. In an example illustrated in FIG. 5, a candidate region. 30 exists within the range of processing 23. The detection unit 154 sets a circumscribed rectangle 40 of the candidate region 30. The detection unit 154 calculates a ratio of an area of the candidate region 30 to an area of the circumscribed rectangle 40 as a filling ratio. In a case where the filling ratio is a predetermined filling ratio or more, the detection unit 154, leaves the corresponding candidate region 30. In contrast, in a case where the filling ratio is less than the predetermined filling ratio, the detection unit. 154 excludes the corresponding candidate region.

The aspect ratio check executed by the detection unit 154 is described. In the same way as in RIG. 5, the detection unit 154 sets a circumscribed rectangle to the candidate region. The detection unit 154 calculates an aspect ratio of the circumscribed rectangle. In a case where a ratio of a vertical width to a horizontal width of the circumscribed rectangle or a ratio of the horizontal width to the vertical width of the circumscribed rectangle is less than a predetermined ratio, the detection unit 154 leaves the corresponding candidate region 30.

In contrast, in a case where the ratio of the vertical width to the horizontal width of the circumscribed rectangle or the ratio of the horizontal width to the vertical width of the circumscribed rectangle is the predetermined ratio or more, the detection unit 154 excludes the corresponding candidate region. In the case where the ratio of the vertical width to the horizontal width of the circumscribed rectangle or the ratio of the horizontal width to the vertical, width of the circumscribed rectangle is the predetermined ratio or more, it represents that the candidate region is extremely long vertically or horizontally compared to a shape of a general pedestrian, whereby it is unlikely that the candidate region is the detection target.

Next, the detection unit 154 performs the area check, the filling ratio check, and the aspect ratio check on the candidate region, which has been detected from the binary image, and executes corner determination on information of the candidate region that have not been excluded.

Figure 6A:
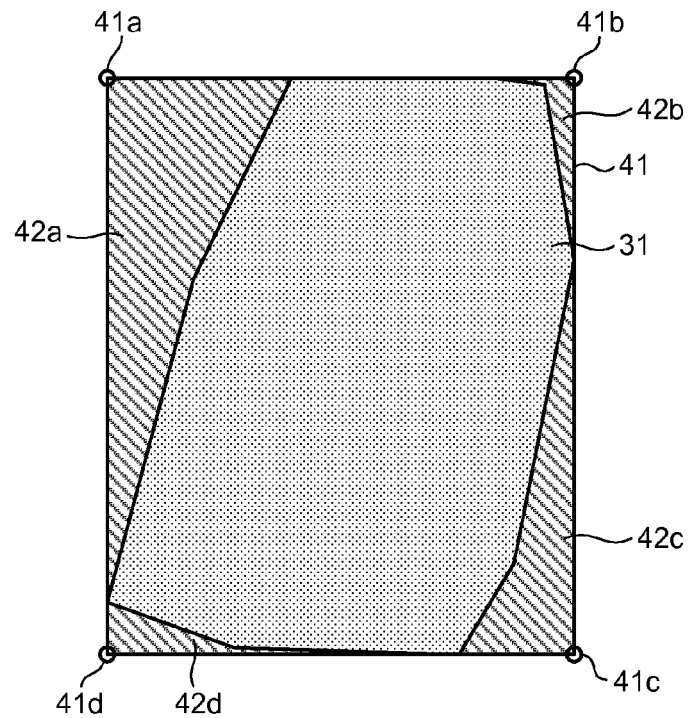
FIG. 6A is a view for describing corner determination processing.
Figure 6B:
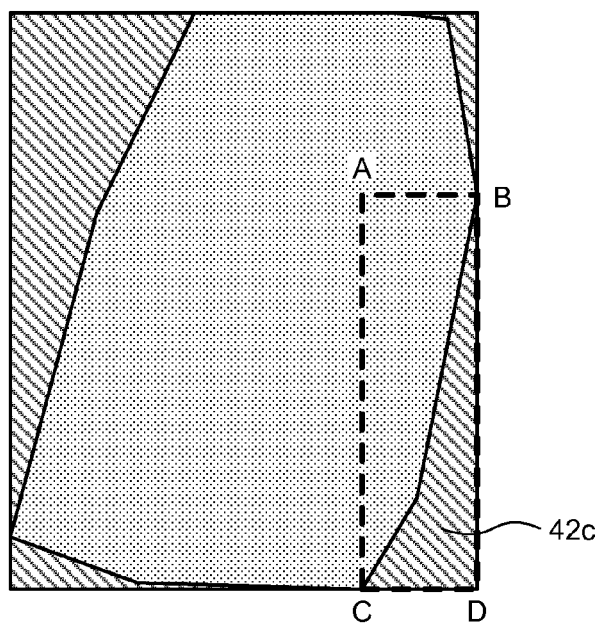
FIG. 6B is a view for describing a calculation method of triangularity.

The corner determination processing executed by the detection unit 154 is described. FIG. 6A is a view for describing the corner determination processing. In FIG. 6A, a candidate region 31 is a candidate, region detected in the above-described labeling processing and corresponds to the candidate region that is not excluded by the area check, the filling ratio check, and the aspect ratio check. A circumscribed rectangle 41 is a circumscribed rectangle of the candidate region 31.

The detection unit 154 obtains an area of each of corner regions respectively including corners 41a, 41b, 41c, and 41d and excluding the candidate region 31 within the circumscribed rectangle 41. The corner region can be described as a polygon surrounded by a side constituting the circumscribed rectangle and a side constituting the candidate region. In an example illustrated in FIG. 6A, the detection unit 154 obtains the area of each of corner regions 42a, 42b, 42c, and 42d. The detection unit 154 excludes the candidate region based on a size relationship with each of the corner regions. Exclusion conditions of corner regions 1 to 3 are described in following descriptions. Note that in the following descriptions, the corner regions 42a and 42c are represented as pair angle corners. Similarly, the corner regions 42b and 42d are represented as reverse pair angle corners.

The exclusion condition 1 is described. In a case where an area of the pair angle, corners is a predetermined area or greater, the detection unit 154 excludes the corresponding candidate region.

The exclusion condition 2 is described. In a case where an area of at least one of the pair angle corners is a predetermined area or greater as well as an area of the reverse pair angle corners is less than a predetermined area, the detection unit 154 excludes the corresponding candidate region.

The exclusion condition 3 is described. In a case where the area of the pair angle corners is a predetermined area or greater, triangularity of the pair angle corners is a predetermined triangularity or greater, and the area of the reverse pair angle corners is less than a predetermined area, the detection unit 154 excludes the corresponding candidate region.

Note that a threshold value used in the exclusion conditions 1 to 3 may be changed according to a size of the area of the circumscribed rectangle 41. For example, when the area of the circumscribed rectangle 41 is 0, the threshold value is obtained by S divided by 6. Note that in a case where the threshold value is less than 40 pixels, the threshold value is set to 40.

A method of calculating the triangularity is described. FIG. GB is a view for describing the method of calculating the triangularity. Here, a case of obtaining the triangularity of the corner region 42c is described. A pixel value of pixels included in a triangle BCD is set to 1, and a pixel value of pixels surrounded by a triangle ABC is set to 0. Then, the triangularity of the corner region 42c can be calculated by dividing an area having the pixel value of 1 among the pixels included in a rectangle ABCD by the rectangle ABCD.

Figure 7:
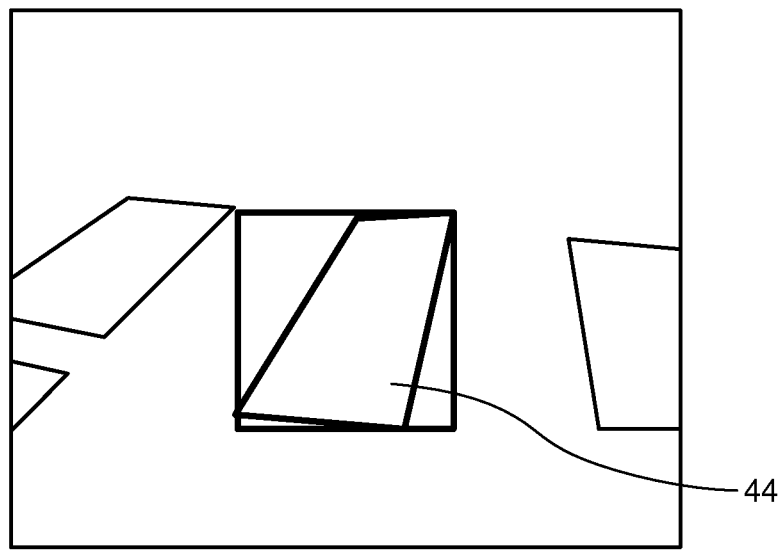
FIG. 7 is a view illustrating one example of a candidate region meeting an exclusion condition.

Here, one example of the candidate region meeting the exclusion condition and one example of the candidate region not meeting the exclusion condition are described. FIG. 7 is a view illustrating one example of the candidate region meeting the exclusion condition. As illustrated in FIG. 7, paint within own lane and the like contain many straight line components and are geometrical. When the paint is extracted as a candidate region 44, it corresponds to any of the exclusion conditions 1 to 3, whereby it is excluded.

Figure 8:
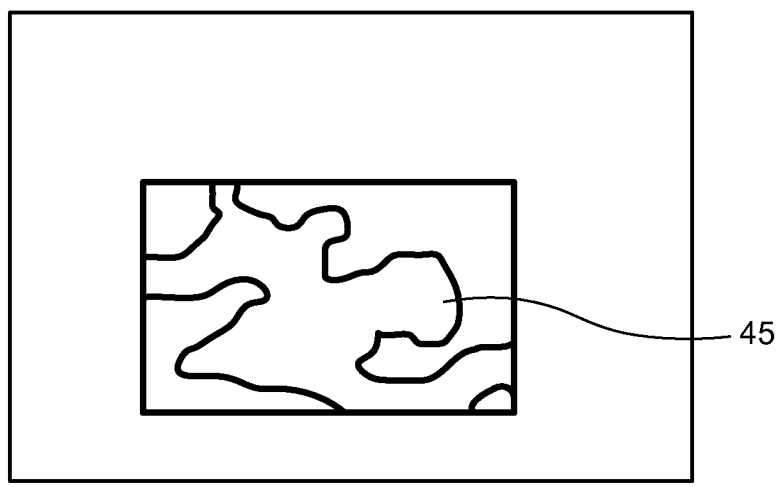
FIG. 8 is a view illustrating one example of the candidate region meeting the exclusion condition.

FIG. 8 is a view illustrating one example of the candidate region meeting the exclusion condition. As illustrated in FIG. 8, a pedestrian or the like contains few straight line components and does not have a geometrical shape. When such pedestrian or the like is extracted as a candidate region 45, it does not correspond to the exclusion conditions 1 to 3, whereby it is not excluded.

The detection unit 154 outputs the information of the candidate region that have not been excluded by the above-described exclusion conditions 1 to 3 to the identification unit 155. As described above after acquiring the binary image from the processing image creation unit 153, the detection unit 154 executes the labeling processing and the corner determination processing and outputs the information of each of the candidate regions that have not been excluded to the identification unit 155. Note that each of the candidate regions is associated with information of the frame number at a detection source and the location coordinates.

The identification unit 155 is a processing unit that acquires the information of the candidate region from the detection unit 154 and specifies a frame including the detection target. Based on the information of the candidate region, the identification unit 155 determines whether or not each of the candidate regions having a consecutive frame number overlaps with each other. In a case where each of the candidate regions having the consecutive frame number partially overlaps with each other, the identification unit 155 determines that each of the candidate regions is the detection target.

Figure 9:
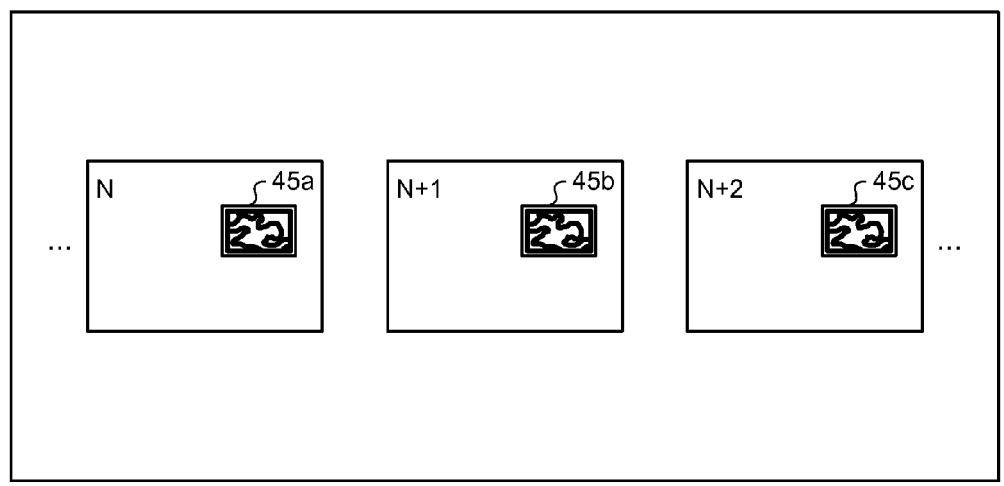
FIG. 9 is a view for describing processing by an identification unit.

FIG. 9 is a view for describing processing by the identification unit. The frame number of a candidate region 45a in FIG. 9 is denoted as N, the frame number of a candidate region 45b is denoted as N+1, and the frame number of a candidate region 45c is denoted as N+2. For example, the identification unit 155 determines that the candidate regions 45a, 45b, and 45c are the detection targets in a case where an area in which the candidate region 45a overlaps with the candidate region 45b is equal to or greater than a predetermined area and an area in which the candidate region 45b overlaps with the candidate region 45c is equal to or greater than a predetermined area.

In contrast, the identification unit 155 determines that the candidate regions 45a, 45b, and 45c are not the detection targets in a case where the area in which the candidate region 45a overlaps with the candidate region 45b is less than the predetermined area or the area in which the candidate region 45b overlaps with the candidate region 45c is less than the predetermined area.

The identification unit 155 outputs the frame number of each of the candidate regions determined as the detection target. For example, the identification unit 155 may output the frame number to the display unit 130 or may inform another device of the frame number through the communication unit 110.

Figure 10:
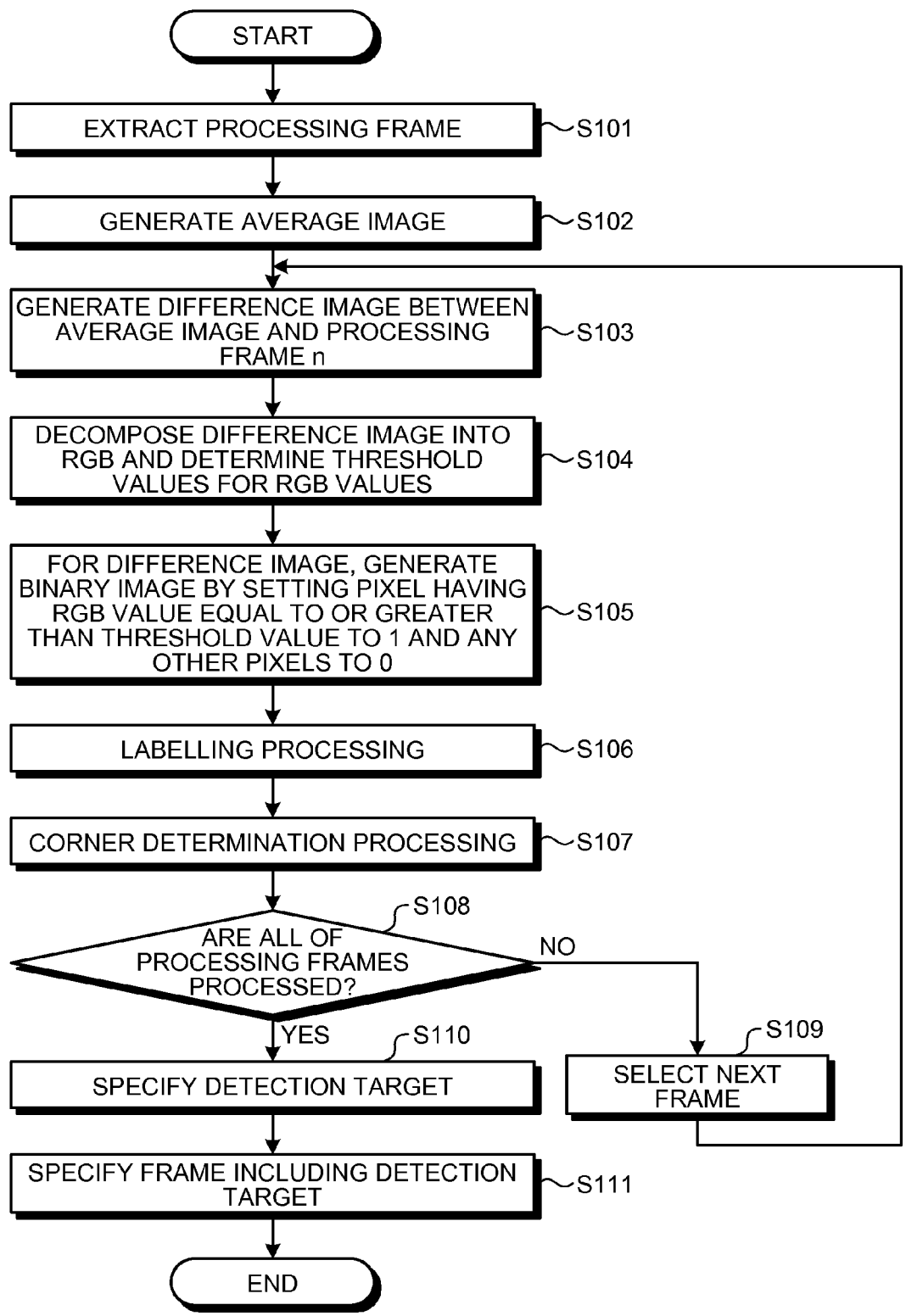
FIG. 10 is a flowchart illustrating a processing procedure of the image processing apparatus according to the second embodiment.

Next, a processing procedure of the image processing apparatus. 100 according to the second embodiment is described. FIG. 10 is a flowchart illustrating the processing procedure of the image processing apparatus according to the second embodiment. For example, the flowchart illustrated in FIG. 10 is executed upon receipt of a processing execution command. The image processing apparatus 100 may receive the processing execution command from the input unit 120 or from another device through the communication unit 110.

As illustrated in FIG. 10, the image processing apparatus 100 extracts the processing frame, (step S101) and generates the average image (step S102). The image processing apparatus 100 generates the difference image between the average image and an image of a processing frame n (step S103).

The image processing apparatus 100 decomposes the difference image into the RGB and determines the threshold values for the RGB values (step S104). For the difference image, the image processing apparatus 100 generates the binary image by setting the pixels having the RGB values equal to or greater than the threshold values to 1 and any other pixels to 0 (step S105).

The image processing apparatus 100 executes the labeling processing (step S106) and executes the corner determination processing (step S107). The image processing apparatus 100 determines whether or not all of the processing frames have been processed (step S108). In a case where all of the processing frames have not been processed (No in step S108), the image processing apparatus 100 selects the next frame (step S109) and proceeds to step. S103.

On the other hand, in a case where all of the processing frames have been processed (Yes is step S108), the image processing apparatus 100 specifies the detection target (step S110), and it specifies the frame including the detection target (step S111).

Next, an effect of an image processing apparatus 100 according to the second embodiment is described. The image processing apparatus 100 according to the second embodiment detects the region in which the pixel value is changed between the frames included in the moving image data, and based on the filling ratio of the detected region to the circumscribed rectangle of the region, specifies the frame including the detection target. For example, in many cases, the paint within the lane appears as the region having a nearly rectangular shape on the image whereas a pedestrian, a bicycle, and the like to be the detection target have an irregular shape. Therefore, it is possible to accurately detect the detection target by using the filling ratio relative to the circumscribed rectangle.

The image processing apparatus 100 specifies the frame including the detection target based on the size relationship with a plurality of corner regions, which is formed based on the circumscribed rectangle and the candidate region. In many cases, the paint on a road surface appears as a region having a nearly rectangular shape on the image whereas the detection target such as a pedestrian has an irregular shape. Therefore, by using the size relationship with the corners formed by the circumscribed rectangle and the candidate region, it is possible to distinguish the detection target such as a pedestrian from the paint on the road surface.

The image processing apparatus 100 specifies the frame including the detection target by further using the aspect ratio of the circumscribed rectangle. In a case where the ratio of the vertical width to the horizontal width of the circumscribed rectangle or the ratio of the horizontal width to the vertical width of the circumscribed rectangle is equal to or greater than a predetermined ratio, it represents that the candidate region is extremely long vertically or horizontally compared to a shape of a general pedestrian, whereby it is unlikely that the candidate region is the detection target.

Therefore, by further using the aspect ratio of the circumscribed rectangle, it is possible to more accurately distinguish the detection target such as a pedestrian from the paint on the road surface.

The image processing apparatus 100 detects the candidate region by using a frame in which the speed is reduced. When the speed is increased, it may be because a cause of deceleration has been solved, whereby it is very likely that the detection target is not in a frame at the point where the speed is increased. By using the frame during the deceleration, it is possible to reduce unnecessary detection processing.

The image processing apparatus 100 detects the candidate region from a predetermined range, including own lane. Therefore, by setting only the region in which it is very likely that the detection target such as a pedestrian exists as the detection target, it is possible to reduce an overall calculation amount.

Figure 11:
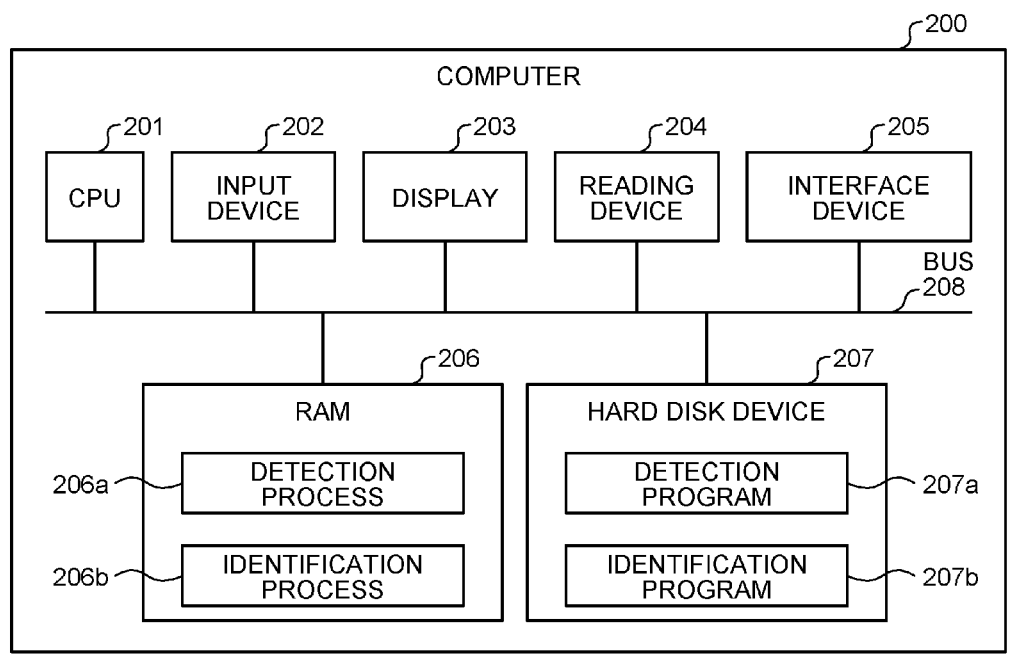
FIG. 11 is a view illustrating one example of computer that executes an image processing program.

Next, one example of a computer that executes an image processing program for realizing a similar function as the image processing apparatus described in the above embodiments. FIG. 11 is a view illustrating one example of the computer that executes the image processing program.

As illustrated in FIG. 11, a computer 200 includes a CPU 201 that executes various arithmetic processing, an input device 202 that receives data input from a user, and a display 203. The computer 200 also includes a reading device 204 that reads a program and the like from a storage medium, and an interface device 205 that performs giving and receiving of data with another computer through a network. The computer 200 also includes a RAM 205 that temporarily stores a variety of information and a had disk device 207. Then, each of the devices 201 to 207 is connected to a bus 208.

The hard disk device 207 includes a detection program 207a and an identification program. 207b, for example. The CPU 201 reads each of the programs 207a and 207b and expands them into the RAM 206.

The detection program 207a functions as a detection process 206a. The identification program 207b functions as an identification process 206b.

For example, the detection process 206a corresponds to the detection units 11, 154, and the like. The identification process 206b corresponds to the identification units. 12, 155, and the like.

It is also possible to store each of the programs 207a and 207b in a "portable physical medium", such as a flexible disk (FD), a CD-ROM, a DUD disk, a magneto optical disk, and an IC card, to be inserted into the computer 200. Then, each of the programs 207a and 207b may be read therefrom and executed by the computer 200.

According to one embodiment of the present invention, an effect is provided that the detection target can be accurately detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit, and scope of the invention.

What is claimed is:

1. An image processing apparatus, comprising:
a processor configured to execute a process including:
detecting regions in which a pixel value is changed between frames included in moving image data;
selecting a region whose a filling ratio of the region to a circumscribed rectangle of the region is greater than or equal to a threshold among the regions; and
specifying a frame including a detection target based on a filling ratio of the region selected at the selecting, and a size of a plurality of corner regions surrounded by the circumscribed rectangle and the region.

2. The image processing apparatus according to claim 1, wherein
the specifying includes specifying the frame including the detection target based on a size relationship with a plurality of corner regions formed based on the circumscribed rectangle and the region.

3. The image processing apparatus according to claim 2, wherein
the specifying includes specifying the frame including the detection target by further using an aspect ratio of the circumscribed rectangle.

4. The image processing apparatus according to claim 3, wherein
the moving image data is associated with speed data, and the detecting includes detecting the region by using a frame in which speed is reduced among each of the frames included in the moving image data.

5. The image processing apparatus according to claim 4, wherein
the detecting includes detecting the region from a predetermined range including own lane.

6. An image processing method executed by a computer, the method comprising:
detecting regions in which a pixel value is changed between frames included in moving image data;
selecting a region whose a filling ratio of the region to a circumscribed rectangle of the region is greater than or equal to a threshold among the regions; and
specifying a frame including a detection target based on a filling ratio of the region selected at the selecting, and a size of a plurality of corner regions surrounded by the circumscribed rectangle and the region.

7. A non-transitory computer-readable recording medium storing an image processing program that causes a computer to execute a process including:
detecting regions in which a pixel value is changed between frames included in moving image data;
selecting a region whose a filling ratio of the region to a circumscribed rectangle of the region is greater than or equal to a threshold among the regions; and
specifying a frame including a detection target based on a filling ratio of the region selected at the selecting, and a size of a plurality of corner regions surrounded by the circumscribed rectangle and the region.

* * * * *